US00RE39427E

(19) United States
(12) Reissued Patent
O'Sullivan

(10) Patent Number: US RE39,427 E
(45) Date of Reissued Patent: Dec. 12, 2006

(54) CELLULAR TELEPHONE DATA COMMUNICATION SYSTEM AND METHOD

(75) Inventor: Harry M. O'Sullivan, West Covina, CA (US)

(73) Assignee: MLR, LLC, Palm Beach Gardens, FL (US)

(21) Appl. No.: 09/835,464

(22) Filed: Apr. 17, 2001

Related U.S. Patent Documents

Reissue of:
(64) Patent No.: 4,697,281
Issued: Sep. 29, 1987
Appl. No.: 06/839,564
Filed: Mar. 14, 1986

U.S. Applications:
(63) Continuation of application No. 08/436,863, filed on May 8, 1995, now Pat. No. Re. 37,141, which is a continuation of application No. 07/930,251, filed on Aug. 17, 1992, now abandoned, which is a division of application No. 07/414,468, filed on Sep. 29, 1989, now Pat. No. Re. 34,034, which is a continuation-in-part of application No. 06/786,641, filed on Oct. 11, 1985, now abandoned.

(51) Int. Cl.
*H04B 1/38* (2006.01)

(52) U.S. Cl. ..... 455/557; 455/126; 455/69; 455/569.2

(58) Field of Classification Search ..... 455/414.2, 455/414.3, 424, 425, 426.1, 426.2, 550.1, 455/556.1, 557, 569.2, 575.9, 90.1, 90.2, 455/126, 69; 370/352, 353, 354, 355, 395.63, 370/395.64, 395.65

See application file for complete search history.

(56) References Cited

U.S. PATENT DOCUMENTS 3,613,004 A 10/1971 Wycoff
3,657,700 A 4/1972 Lutzker (Continued)

FOREIGN PATENT DOCUMENTS

DE 3433900 A1 3/1986
DE 3433900 3/1986

(Continued)

OTHER PUBLICATIONS le;.5qFisher, The Bell System Technical Journal (specifically "A Subscriber Set for the Equipment Test") Jan. 1979, vol. 58, No. 1, pp. 123–143.*

(Continued)

*Primary Examiner*—Nay Maung
*Assistant Examiner*—Tanmay Lele
(74) *Attorney, Agent, or Firm*—Charles M. Leedom, Jr.

(57) ABSTRACT

The cellular telephone data communication system and method involves the use of a mobile data processing interface and a cooperating static data processing interface to effectively transmit data over a cellular telephone system. Each data processing interface includes a processor which operates in the transmitting mode to add an error control correction data format to data received from an external data source. The data is divided into packets and provided to a modem which is uniquely operated to eliminate the action of the modem scramble system and to remain active in spite of a carrier signal loss. The modem is deactivated or disconnected by a disconnect signal from the processor, and when carrier signal loss occurs, this disconnect signal is provided only after the lapse of a delay period without the resumption of the carrier signal. The error control correction data format causes a receiver to evaluate the received data for error and to retransmit an acknowledgment signal for each acceptable packet of received data. In the absence of an acknowledgment signal, the processor will again provide a data packet to the modem for retransmission. Also, the processor will determine the frequency of error in the received data from the acknowledgment signals and subsequently adjust the data packet size in accordance with this error frequency.

21 Claims, 4 Drawing Sheets

Microfiche Appendix Included
(1 Microfiche, 75 Pages)

U.S. PATENT DOCUMENTS

| | | | | | |
|---|---|---|---|---|---|
| 3,674,935 | A | | 7/1972 | Lawrence | |
| 3,711,777 | A | | 1/1973 | Tink | |
| 3,714,586 | A | | 1/1973 | Mason | |
| 3,714,650 | A | | 1/1973 | Fuller et al. | |
| 3,745,251 | A | | 7/1973 | Fretwell | |
| 3,766,479 | A | | 10/1973 | Thalimer et al. | |
| 3,851,112 | A | | 11/1974 | Kusan | |
| 3,878,333 | A | | 4/1975 | Shimizu et al. | |
| 3,899,772 | A | | 8/1975 | Mead et al. | |
| 3,927,259 | A | | 12/1975 | Brown | |
| 3,939,431 | A | | 2/1976 | Cohlman | |
| 3,974,343 | A | | 8/1976 | Cheney | |
| 4,012,596 | A | | 3/1977 | West, Jr. et al. | |
| 4,025,853 | A | | 5/1977 | Addeo | |
| 4,094,484 | A | | 6/1978 | Galione | |
| 4,109,283 | A | | 8/1978 | Rast | |
| 4,156,867 | A | * | 5/1979 | Bench et al. | 714/758 |
| 4,178,476 | A | * | 12/1979 | Frost | |
| 4,284,849 | A | | 8/1981 | Anderson et al. | |
| 4,330,862 | A | | 5/1982 | Smolik | |
| 4,337,376 | A | | 6/1982 | Gruenberg | |
| 4,371,751 | A | | 2/1983 | Hilligoss, Jr. et al. | |
| 4,376,310 | A | | 3/1983 | Stackhouse et al. | |
| 4,403,322 | A | | 9/1983 | Kato et al. | |
| 4,414,661 | A | * | 11/1983 | Karlstrom | 370/332 |
| 4,415,774 | A | | 11/1983 | Driver | |
| 4,419,756 | A | | 12/1983 | Cheng-Quispe et al. | |
| 4,425,665 | A | | 1/1984 | Stauffer | |
| 4,434,461 | A | | 2/1984 | Puhl | |
| 4,475,010 | A | * | 10/1984 | Huensch et al. | 370/334 |
| 4,481,670 | A | * | 11/1984 | Freeburg | 455/69 |
| 4,486,624 | A | * | 12/1984 | Puhl et al. | 370/278 |
| 4,488,002 | A | | 12/1984 | Seibel | |
| 4,490,579 | A | * | 12/1984 | Godoshian | 340/7.55 |
| 4,498,173 | A | | 2/1985 | Reudink | |
| 4,503,288 | A | | 3/1985 | Kessler | |
| 4,517,669 | A | | 5/1985 | Freeburg et al. | |
| 4,519,068 | A | | 5/1985 | Krebs et al. | |
| 4,524,244 | A | | 6/1985 | Faggin et al. | |
| 4,525,861 | A | | 6/1985 | Freeburg | |
| 4,545,071 | A | | 10/1985 | Freeburg | |
| 4,549,308 | A | | 10/1985 | LoPinto | |
| 4,551,842 | A | * | 11/1985 | Segarra | 714/704 |
| 4,556,760 | A | | 12/1985 | Goldman | |
| 4,558,178 | A | | 12/1985 | Yasuda et al. | |
| 4,562,572 | A | * | 12/1985 | Goldman et al. | |
| 4,568,800 | A | | 2/1986 | Orikasa | |
| 4,577,182 | A | | 3/1986 | Millsap et al. | |
| 4,578,537 | A | | 3/1986 | Faggin et al. | |
| 4,578,796 | A | | 3/1986 | Charalambous et al. | |
| 4,587,652 | A | * | 5/1986 | Goldman | 370/110.1 |
| 4,591,661 | A | | 5/1986 | Benedetto et al. | |
| 4,637,022 | A | * | 1/1987 | Burke et al. | |
| 4,638,022 | A | | 1/1987 | Burke et al. | |
| 4,644,351 | A | | 2/1987 | Zabarsky et al. | |
| 4,654,867 | A | * | 3/1987 | Labedz et al. | 379/59 |
| 4,656,318 | A | | 4/1987 | Noyes | |
| 4,658,096 | A | | 4/1987 | West, Jr. et al. | |
| 4,660,218 | A | | 4/1987 | Hashimoto | |
| 4,661,659 | A | | 4/1987 | Nishimura | |
| 4,667,653 | A | | 5/1987 | Cornell | |
| 4,675,863 | A | | 6/1987 | Paneth et al. | |
| 4,677,656 | A | | 6/1987 | Burke et al. | |
| 4,680,787 | A | | 7/1987 | Marry | |
| 4,685,123 | A | | 8/1987 | Hsia | |
| 4,691,314 | A | | 9/1987 | Bergins et al. | |
| 4,694,473 | A | | 9/1987 | Etoh | |
| 4,697,281 | A | | 9/1987 | O'Sullivan | |
| 4,698,839 | A | | 10/1987 | DeVaney et al. | |
| 4,718,080 | A | | 1/1988 | Serrano et al. | |
| 4,737,975 | A | | 4/1988 | Shaffer | |
| 4,751,725 | A | | 6/1988 | Bonta et al. | |
| 4,752,949 | A | | 6/1988 | Steinbeck et al. | |
| 4,759,059 | A | | 7/1988 | Christensen | |
| 4,775,997 | A | | 10/1988 | West, Jr. et al. | |
| 4,823,362 | A | | 4/1989 | Etoh | |
| 4,823,373 | A | | 4/1989 | Takahashi et al. | |
| 4,837,800 | A | | 6/1989 | Freeburg et al. | |
| 4,837,812 | A | | 6/1989 | Takahashi et al. | |
| 4,852,146 | A | | 7/1989 | Hathcock et al. | |
| 4,868,859 | A | | 9/1989 | Sheffer | |
| 4,868,863 | A | | 9/1989 | Hartley et al. | |
| 4,887,290 | A | | 12/1989 | Dop et al. | |
| 4,890,315 | A | | 12/1989 | Bendixen et al. | |
| 4,912,756 | A | | 3/1990 | Hop | |
| 4,922,517 | A | | 5/1990 | West, Jr. et al. | |
| 4,955,083 | A | | 9/1990 | Phillips et al. | |
| 4,972,457 | A | | 11/1990 | O'Sullivan | |
| 4,972,462 | A | | 11/1990 | Shibata | |
| 4,991,197 | A | | 2/1991 | Morris | |
| 5,025,254 | A | | 6/1991 | Hess | |
| 5,046,082 | A | | 9/1991 | Zicker et al. | |
| 5,046,187 | A | | 9/1991 | Takahashi | |
| 5,073,921 | A | | 12/1991 | Nomura et al. | |
| 5,081,673 | A | | 1/1992 | Engelke et al. | |
| 5,095,534 | A | | 3/1992 | Hiyama | |
| 5,127,041 | A | | 6/1992 | O'Sullivan | |
| 5,131,019 | A | | 7/1992 | Sheffer et al. | |
| 5,134,648 | A | | 7/1992 | Hochfield et al. | |
| RE34,034 | E | | 8/1992 | O'Sullivan | |
| 5,170,470 | A | | 12/1992 | Pindar et al. | |
| 5,202,963 | A | | 4/1993 | Zelley | |
| 5,249,218 | A | | 9/1993 | Sainton | |
| 5,261,117 | A | | 11/1993 | Olson | |

FOREIGN PATENT DOCUMENTS

| | | | |
|---|---|---|---|
| EP | 0295146 | | 6/1988 |
| EP | 0309627 | | 4/1989 |
| GB | 2170977 | | 2/1986 |
| GB | 2170977 | A | 8/1986 |
| GB | 2256113 | | 11/1992 |
| GB | 2170977 | | 2/1996 |
| WO | 86 00207 | | 7/1986 |
| WO | 87 00718 | | 1/1987 |
| WO | 88 04362 | | 12/1988 |
| WO | 89 05553 | | 6/1989 |
| WO | 89 03710 | | 8/1989 |
| WO | 90 03076 | | 3/1990 |
| WO | 91 07044 | | 5/1991 |
| WO | 92 10047 | | 6/1992 |

OTHER PUBLICATIONS

MicroPatent's Patent Index Database: Complete Family of GB 2170977 B; Jun. 11, 2003; 5 pages.

MicroPatent's Patent Index Database: Complete Family of DE 3433900 C2; Jun. 11, 2003; 2 pages.

Ozanich, Gary W., "Trafficking In Cellular Radio Technology", Computerworld On Communications, Jan. 18, 1984; p. 599–604.

"Sierra Wireless: AMPS Circuit–Switched Cellular" Technical Document; 1 page.

"PCS Data Knowledge Site" Website; 2 pages.

Sprint PCS Dialer S/W, User Guide p. 4; 1 page.

Sprint PCS Dialer S/W, User Guide, FAQ p. 216; 1 page.

Cellular System Mobile Station—Land Station Compatibility Specification; Electronic Industries, Association 1987.

Fisher; Advanced Mobile Phone Service: A Subscriber Set for the Equipment Test; The Bell System, Technical Journal, Jan. 1979, pp. 123–143.

Grossman; Datenfunk—Ubertragungsverfahren und Software–Moglichkeiten; pp. 289–292.
Haug; Mobile Telephony in the Nordic Countries; Ericsson Review, 1981, vol. 58, No. 3; pp. 120–127.
Haug; The Nordic Mobile Telephone System, An Extension of the Telephone Network; IEEE, 1983; pp. 1405–1409.
Heidorn; Updating Software in a Real–Time Distributed System; IEEE, 1983; pp. 640–643.
Huttunen; The Role of the Microprocessor in Increasing the Flexibility of a Radiotelephone, 107–81; Radiotelephones; Helsinki 1982; 17 pages.
Kahn; Advances in Packet Radio Technology; Proc. of the IEEE, 1978, vol. 66, No. 11; pp. 1468–1496.
Nokia Corporation's First Supplemental Response to MLR's Interrogatory No. 2; May 30, 2003; pp. 1–8, and Exhibit A, pp. 12–21.
Nokia–Mobira; The Finnish World Famous Mobile Telephone; 8 pages.
Nokia–Mobira; The Mobile Telephone at Your Service Even Without Your Car; 8 pages.
Nordic NMT–900; Automatic Cellular Mobile Telephone System; Jan. 1985; NMT Doc. 900–3; pp. 159–163.
NMT: problems of success; Communications International, Dec. 1984; pp. 44,49,50.
Mobil im Kontakt mit dem GroBrechner; Funkschau, Feb. 1984; pp. 41–44.
Philips; Nordic Mobile Telephone Manual 195, ap 3733–1; Jan. 2, 1984; 54 pages.
Sandler; AT&T, Bell Test Cellular Modem; PC Week, Jul. 2, 1985, v2, n26, p. 12; 3 pages.
Sandler; Cellular Phones: Dick Tracy's Wrist Radio Comes of Age; PC Week, Feb. 12, 1985; v2, n6, p. 29; 3 pages.
Stone; Clompanies Join to Develop 2,400–BPS Cellular Modems; 1 page.
Tjainen; Testing a Complicated Automatic Mobile Telephone System (NMT); IEE 1984; Conference Publication No. 238; pp. 76–80.
Advanced Mobile Phone Service, Inc.; "Cellular Mobile Telephone Equipment Specification"; May 1983.
Lilly, "Cellular Modems Show Wide Promise, Narrow Use", PC Week, Jan. 7, 1986, pp. 132, 134.
Mier, "Tuning Into Cellular Radio", Data Communications, Sep. 1982, pp. 40–41.
Mobile Data Report, "Borland's Sidekick 2.0 to Dispatch Pages, Toshiba Debuts Cellular Modem at Comdex", Nov. 19, 1990; pp. 1–4.
Mobile Data Report, "NEC Introduces Laptop, Phone, RJ–11 Briefcase", Oct. 22, 1990; pp. 4–5.
Nordic Mobile Telephone, "Technical Specification for the Mobile Station", NMT DOC. 3.1979; Oct. 1979, 3rd Edition, pp. 1–95; Annex No. 1 and 2.
TM 1366435, Oct. 22, 1985.
"Advanced Mobile Phone Service: A Subscriber Set For The Equipment Test," R.E. Fisher, Bell System Technical Jouranl, vol. 58, No. 1, Jan. 1979.
"Advanced Mobile PhoneService," F.H. Blecher, IEEE.
"An 800Mhz Approach to Underground Data Communications," T.M. Caridi and P. Mighdoll, IEEE 1981 Industry Applications.
"ARQ Schemes for Data Transmission in Mobile Radio Systems," R.A. Comroe and J. Costello, Jr., IEEE Transactions on Vehicular Technology, vol. VT–33, Aug. 1984.
"AT&T 208A Data Set Product," Jul. 1975, Circuit Description, DC–1D232–01.
Bush, Data Communication, Oct. 1986, p. 74.
"Dialing Data Via Mobile Telephones", Ira Brodsky, pp. 103–110, Data Communications International, Oct. 1989.
"Data Signaling Functions for a Cellular Mobile Telephone System," V. Hachenburg, B.D. Holm, and J.I. Smith, IEEE Transactions on Vehicular Technology, vol. VT 26, No. 1, Feb. 1977.
"Data Transmissions Over VHF and UHF Land Mobile Radio Channels," P.J. Cadman and R.L. Brewster, IEEE Proceedings vol. 130, Part F, No. 6, Oct. 1983.
"Data Transmission for Mobile Radio," T. Brenig, IEEE Transactions on Vehicular Technology, VT–27 No. 3, Aug. 1978.
Excerpt from "Digital Fundamental", 3rd edition, by Thomas L. Floyd, Copyright 1986, pp. 562–569.
"Low Bit–Rate Speech Coders Applicable in Mobile Satellite Communications Systems," Neviano Dal Degan and Fulvio Russina Cselt—Control Studi e Laboratori Telecommunicazioni S.p.A. via G. Reiss Romoli, 274 –10148, Torino Italy.
"Optimal Blocklengths for ARQ Error Control Schemes," Joel M. Morris, IEEE Transactions on Communications, vol. COM–27, No. 2, Feb. 1979.
Overview of AMPS Mobile Call Processing System, Robert M. Fuller and Fred A. Epler, 1980 Annual Conference of the IEEE Vehicular Technology Society.
Barker and Nadeau, "Modem for Cellular Phones", Byte, Oct. 1985, p. 396.
Bruno, Bell, "Excuse Me Your Laptop is Ringing . . . ", Personal Computing, Jun. 1989, p. 40.
Computer & Software News, "Omnitel Bows v. 32 9600 bps Modem . . . ", Nov. 14, 1998, vol. 6, No. 46, p. 48.
Computer World, Apr. 25, 1988, p. 60, "'EDI Yellow Pages' Goes to Press".
Day, "Letters From the Road: Around the World With a Laptop . . . ", PC Computing, Jul. 1989, p. 108.
Dryden, "PCs Phone Home: Cellular, Radio Links . . . " Infoworld, Feb. 19, 1990, p. 31.
Dryden, "Toshiba Signals Move to Cellular Communication . . . ", Infoworld, Jun. 18, 1990, p. 37.
Hindin, PC Week, Jun. 28, 1988, "Cellular Laptop Phones? Maybe; . . . ".
Hindin, "Speed, Low Prices Featured in New Modem Offerings . . . ", PC Week, Nov. 10, 1987, p. c3, v.4, No. 45.
Hurwood, "Do Your Modems Measure Up?. . . ", Computer & Communications Decisions, Apr. 9, 1985, p. 134, vol. 17.
Howe, "Industry Watches as AT&T is Unleashed . . . ", Data Communications, Dec. 1982, p. 141–146.
Infoworld, Oct. 12, 1987, p. 8, "Several Exhibitors Offer Glimpse of What to Expect at Comdex".
Kramer, "Advances Freeing Communicators on the Go; . . . ", PC Week, Nov. 13, 1989, p. 100, vol. 6, No. 45.
Kramer, "Vendors Compete to Establish Cellular Standard; . . . ", PC Week, Sep. 17, 1990, p. 133,v7,No. 37.
Kramer, "Cellular Modems in Need of Industry Standard; . . . ", PC Week, Sep. 17, 1990, p. 129.
Kramer, "Telebit's Cellular Modem Boasts 16.8K–bps Speed; . . . ", PC Week, Dec. 11, 1989, p. 43, v.6, No. 49.
Network World, Apr. 18, 1988, p. 15.
O'Malley, "The Well Connected Laptop; . . . ", Personal Computing, Jun. 29, 1990, p. 106, vol. 14, No. 6.
PC Week, Jul. 16, 1985, p. 37, "Why Lap–top PC Users Need a Cellular Assist" vol. 2.

Reiter, "How Ya Gonna Call? . . . ", Network World, Oct. 26, 1987, p. 31.
Reiter and Thompson, "Data on the Go: Three Cellular Modems", PC Magazine, Dec. 25, 1990, pp. 365–382.
Rosenthal, "Radio Modems Meet The Need for True Portability . . . ", PC Week, Mar. 18, 1986, p. s51, vol. 3.
Stone, "Keeping in Touch; On–The–Road Communication Needs", PC Magazine, May 15, 1990, p. 220.
Stone, "Companies join to Develop 2,400–BPS Cellular Modems", Infoworld, Sep. 7, 1987, p. 12.
Van Kirk, "Have Your Car Call My Car . . . ", PC Computing, Nov. 1989, p. 136, vol. 2, No. 11.
Welch, "Modem Links Micros to Car Phones", Feb. 3, 1986, p. 14, Infoworld.
Zimmerman, "Toshiba Modem Boasts Wireless Transmission . . . ", PC Week, Jun. 18, 1990, p. 49.
Millicom, "Cellular Portable Telephone", cited in U.S. patent No. 4,654,867.
CST News, Apr. 1986, vol. 2, No. 10, "Desktop Computer Goes Portable", pp. 1–2.
Spectrum Cellular News Release, Aug. 24, 1987, "Spectrum Cellular and Omnitel Announce Joint Development of First Internal Laptop Cellular Modem".
What Telephone & Comm. News, No. 14, Oct. 14, 1985, pp. 28–31, "Data Communications on Cellular—The Office of Tomorow in Your Car Today".
Complaint for *Handspring, Inc.* v. *MLR, LLC.*
Trademark Registration No. 1366435 Mark: Bridge.
F. R. Berfler, Jr.; A Tale of Two Modems; PC Magazine; Aug. 21, 1984.
Z. C. Fluhr & P. T. Porter; Advanced Mobile PhoneService: Control Architecture; Bell System Technical Journal; vol. 58, No. 1; Jan. 1979.
R. E. Fisher; Advanced Mobile Phone Service: A Subscriber Set for the Equipment Test; Bell System Technical Journal; vol. 58, No. 1; Jan. 1979.
F. H. Blecher; Advanced Mobile PhoneService; IEEE.
T. M. Caridi & P. Mighdoll; An 800 Mhz Approach to Underground Date Communications; IEEE 1981 Industry Applications.
R. A. Comroe & J. Costello, Jr; ARQ Schemes for Data Transmission in Mobile Radio Systems; IEEE Transactions on Vehicular Technology; vol. VT–33; Aug. 1984.
AT&T; 208A Data Set Product; Circuit Description, DC–10232–01; Jul. 1975.
AT&T's Dimension PBX described in AT&T publication Bell System Practice Section 503–100–103, Issue 3, Mar. 1981, which relates to a multi–button electronic telephone set.
Bush; Data Communication, Oct. 1976, p. 74.
Cell Data Launched; British Telecom Journal, vol. 6, No. 3, 1985, Autumn.
Cellnet Adds Data to Cellular Service; International News Telephone Engineer and Management, Nov. 1, 1985.
Cellular Link is Step to Portable Office; Electronic, Jun. 28, 1984, pp. 48 & 50.
COMPAQ; SpeedPAQ 144 Modem—Reference Guide.
COMPAQ; COMPAQ Product Quality Statements.
COMPAQ; SpeedPAQ 144 Modem—COMPAQ Portable Computers Installation Guide.
COMPAQ; A COMPAQ and 121/PT128 Data Application . . . ; Jan. 25, 1993.
COMPAQ; SpeedPAQ 144 Modem—Quick Reference.
COMPAQ; SpeedPAQ 14 Modem—About Your Fax Software . . . .
I. Brodsky; Dialing Data Via Mobile Telephones; Data Communications International, Oct. 1989, pp. 103–110.
V. Hachenburg, B. D. Holm, & J. I. Smith; Data Signaling Functions for a Cellular Mobile Telephone System; IEEE Transactions on Vehicular Technology, Feb. 1977, vol. VT 26, No.
P. J. Cadman & R. L. Brewster; Data Transmissions Over VHF and UHF Land Mobile Radio Channels; IEEE Proceedings, vol. 130, Part F, No. 6, Oct. 1983.
T. Brenig; Data Transmission for Mobile Radio; IEEE Transactions on Vehicular Technology, VT–27, No. 3, Aug. 1978.
T. L. Floyd; Excerpt from "Digital Fundamental", 3rd Edition, pp. 562–569; Copyright 1986.
Supplementary European Search Report; Feb. 3, 1985.
Bartimo; Firm Unveils Cellular Bridge; Infoworld, vol. 6, Issue 27, pp. 5, 11, 12.
Galuszka; Data Communications, Jul. 1985, p. 68.
Godin; Electronic, Sep. 1983, p. 121 et seq.
Hayes Smartmodem Owner's Manual; Hayes Microcomputer Products, Inc., 1981.
Information Received From Nokia on Jan. 25, 1993.
Lilly; PC Week, Jan. 7, 1986, p. 135.
Lineback; Electronic Report, Jun. 28, 1994, p. 48.
Dal Degan, et al.; Low Bit–Rate Speech Coders Applicable in Mobile Satellite Communications Systems; Control Studi e Laboratori Telecommunicazioni . . . ; 274–10148.
Millicom Cellular Portable Telephone; Technical Disclosure, Nov. 1984, pp. 1.5, 2.6, 2.18–2.21, 6.11–6.13.
AB3X Cellular Interface Owner's Manual; Morrison & Dempsey Communications; Nov. 1987.
J. M. Morris; Optimal Blocklengths for ARQ Error Control Schemes; IEEE Transactions on Communications, vol. COM–27, No. 2, Feb. 1979.
R. M. Fuller & F. A. Epler; Overview of AMPS Mobile Cell Processing System; 1980 Annual Conference of the IEEE Vehicular Technology Society.
Panasonic's "Easa–Phone" System described in Technical Guide KX–T 30810 for Panasonic's electronic modular switching system; and KX–T 30830 for its associated telephone station.
J. Krebs; Portable Computer and Host Talk Over Radio–Frequency Link; Electronic, vol. 56, Aug. 25, 1983.
D. J. Goodman, et al.; Quality of Service and Bandwidth Efficiency of . . . Variable Bit–Rate Speech Transmission; IEEE Trans. on Vehicular Technology, vol. VT–32, No. 3, Aug. 1983.
J. Krebs; R/F Linked Portable Digital Communications System Overview; Proc. of the National Electronics Conf., 1984, Sep. 24–26, pp. 402–407.
Schneiderman, Computerworld, May 5, 1986, p. 17.
*Spectrum Information Technologies, Inc. et al.* v. *Data Race, Inc.*—Affidavit of Peter Caserta.
*Spectrum Information Technologies, Inc. et al.* v. *Data Race, Inc.*—Affidavit of John Rule.
*Spectrum Information Technologies, Inc. et al.* v. *Data Race, Inc.*—Affidavit of Evan R. Smith.
*Spectrum Information Technologies, Inc. et al.* v. *Data Race, Inc.*—Amended Answer.
*Spectrum Information Technologies, Inc. et al.* v. *Data Race, Inc.*—Amended Complaint.

*Spectrum Information Technologies, Inc. et al.* v. *Data Race, Inc.*—Memo in Support of Plaintiff's Application for Temporary Restraining Order.
*Spectrum Information Technologies, Inc. et al.* v. *Data Race, Inc.*—Response to Plaintiff's Application for Temporary Restraining Order.
*Spectrum Information Technologies, Inc. et al.* v. *Data Race, Inc.*—Transcript of Proceedings.
*Spectrum Information Technologies, Inc. et al.* v. *Data Race, Inc.*—Original Answer and Counterclaims.
*Spectrum Information Technologies, Inc. et al.* v. *Microcom, Inc.*—Complaint.
*Spectrum Information Technologies, Inc. et al.* v. *Microcom, Inc.*—Answer and Counterclaims.
*Spectrum Information Technologies, Inc. et al.* v. *Microcom, Inc.*—Answer to Counterclaims.
*Spectrum Information Technologies, Inc. et al.* v. *Microcom, Inc.*—Judgement.
P. S. Stone; 286 Laptop; Info World News, Apr. 25, 1988, p. 5.
J. E. McNamara; Technical Aspects of Data Communication; Digital Press, Jul. 1979.
Vodafone News, Feb. 13, 1985, two pages.
Bridge Between Data Communications and Cellular Telephone; Data Communications, Sec. New Products, Feb. 1985, p. 218.
Stuart Crump, Jr.; ABIX: Landline Emulator for Cellular; Personal Communications Technology, Jun. 1986, p. 39.
Ameritech Nondisclosure Agreement, Jun. 1, 1985.
Cellular Portable Telephone, Owner's Manual; Millicom.
Letter from Jason Mirabito, Gaston & Snow, Feb. 28, 1990 re: U.S. Patent No. 4,697,281.
High–Tech Cellular Products Demonstrated; Ameritech, vol. 3, No. 34, Sep. 25, 1985.

* cited by examiner

CELLULAR TELEPHONE DATA COMMUNICATION SYSTEM AND METHOD

Matter enclosed in heavy brackets [ ] appears in the original patent but forms no part of this reissue specification; matter printed in italics indicates the additions made by reissue.

This application and continuing application Ser. No. 08/436,863, filed May 8, 1995 (now Re. 37,141), *which is a continuation of* application Ser. No. 07/930,251, filed August 17, 1992 (now abandoned), and *which is a divisional of* application Ser. No. 07/414,468, filed Sep. 29. 1989 (now Re. 34,034) are reissues of application Ser. No. 06/839,564. Filed Sep. 29, 1987, (now Pat. No. 4,697,281), which is a continuation-in-part of Ser. No. 06/786,641, filed Oct. 11, 1985, (now abandoned).

*A microfiche appendix is attached. The total number of microfiche is 1 and the total number of frames is 75.*

The present invention incorporates a microfiche appendix with one microfiche having 75 frames.

TECHNICAL FIELD

The present invention relates to telephone data communications systems generally, and more particularly to a data communication system which is adapted to effectively transmit a data stream over a cellular telephone network.

BACKGROUND ART

Modern computer and telephone system technology have made the transmission of computer originated data over conventional telephone lines a commonplace event. In such systems, a computer is connected through a suitable interface, such an a RS 232 interface, to provide serial data signals to a conventional wire line modem. With modems of this type, when signal quality changes induce errors in the modem data stream, an ARQ (Automatic Repeat Request) or packet repeat scheme is conventionally employed for controlling these errors. This requires a complete repeat of numerous bytes of data until such time as all of the bytes of data in the packet are received correctly. However, the low frequency of signal quality change induced errors in a wire line environment makes this an efficient method of controlling error.

Current wire line modem technology provides a scrambled modulated signal to the telephone line which will not be interpreted by telephone equipment as a valid switch command. To accomplish this, conventional wire line modems are provided with a scrambler circuit which assures that the modulated signal is continuously changing. This changing signal is used by the modem PLL (Phase Locked Loop) circuitry to provide synchronization, for without this scramble modulated signal, a static condition of the modem will cause the PLL to loose synchronization and the telephone equipment to interpret the static signal as a switch command.

Conventional telephone modems have operated effectively to interface computers with a telephone system for data transmission, but these modems do not operate effectively to provide data transmission over conventional cellular telephone equipment. In a cellular telephone system, data transmission must occur to and from a moving vehicle which may be passing between zones or cells in the system. For example, a city with cellular service is divided into a plurality of adjoining geographic cells, each of which has its own transmit/receive antenna controlled by a mobile switching office. For conventional cellular telephone voice communication, an automobile traveling through a city passes from cell to cell, and the signal is transferred from antenna to antenna. This transfer process interrupts communications for a brief period, normally a fraction of a second, and does not cause a problem for voice communication. However, for data communications, this "hand-off" process results in significant problem if conventional wire line modems are used.

A wire line modem for use with normal telephone equipment will disconnect upon experiencing a carrier signal loss. Thus, such a modem, when used with a cellular telephone system, will disconnect each time the vehicle in which the modem is mounted travels between cells, for some carrier loss will always be experienced when the radio signal used for cellular telephone communication is switched between the low power transmission stations of adjacent cells.

In the cellular telephone environment, numerous errors are induced into data transmission because of the problems associated with cellular telephone communication. Echo and fading problems cause multiple bit errors in the data stream, and such problems occur frequently with a moving vehicle. For example, the transmitted signal may hit a building or other obstacle and bounce erratically or fade as the vehicle is shielded from the cell antenna. This high frequency of error in the data stream transmitted by cellular transmission renders the error correction protocol present in conventional wire line modems unsuitable for cellular use. Errors occur so frequently in a cellular environment that the number of repeat requests becomes large and data transmission efficiency is reduced below an acceptable amount. In some instances, errors may occur so often that a correct packet may never be received. Thus, the error correction protocol present in conventional telephone modems is unable to cope with the problems presented in a cellular environment.

Finally, as previously indicated, the conventional wire line telephone modem incorporates scrambler circuitry to ensure that the modulated signal is continuously changing to provide synchronization for the modem PLL circuitry. However, such scramblers employ a polynomial which has the effect of increasing the number of bit errors received. If a single bit error occurs during the transmission of data, that single bit error will be presented when received, but in addition, that error will propagate through the scrambler polynomial and later cause two additional errors in the received data presented to the user. These errors, coupled with those normally inherent with a cellular telephone system, will completely overwhelm the error correction circuitry present in a conventional modem.

In the past, systems have been developed for communicating data between a plurality of geographical zones and a host computer by means of portable radios. Such systems are disclosed in U.S. Pat. Nos. 4,525,861 and 4,545,071 to Thomas A. Freeburg. Although these patented systems effectively provide data communications from a host computer throughout a geographical area divided into zones, they do not address the problems presented by hand-off or echoing and fading in a cellular telephone system.

DISCLOSURE OF THE INVENTION

It is a primary object of the present invention to provide a novel and improved method and apparatus for transmitting data signals over a cellular telephone system.

Another object of the present invention is to provide a novel and improved method for transmitting data over a cellular telephone system by means of a modem connected to the cellular telephone system. The modem is maintained in the activated state for a predetermined time period after a loss of the system carrier signal before it is permitted to deactivate and is caused to remain in the activated state after the loss of the carrier signal if the carrier signal resumes within the predetermined time period.

A further object of the present invention is to provide a novel and improved method for transmitting data over a cellular telephone system by a means of a modem connected to the cellular telephone system which includes adding error control correction data to the data signal before providing the data signal to the modem.

Yet another object of the present invention is to provide a novel and improved method for transmitting data over a cellular telephone system by means of a modem connected to the cellular telephone system which includes repetitively providing a unique data byte to said modem during a break in the data signal to the modem.

A further object of the present invention is to provide a novel and improved method for transmitting data over a cellular telephone system by means of a modem connected to the cellular telephone system which includes adding error control correction data to a data signal before it is provided to the modem and the removing said error control correction signal from the data signal at the receiver before the data signal is provided to a receiver use device.

Yet another object of the present invention is to provide a novel and improved method for transmitting data over a cellular telephone system by means of a modem connected to the cellular telephone system which includes providing no scrambler polynomial in the modem, but instead adding error control correction data to the data signal before providing said data signal to the modem. This error control correction signal consists of a sliding packet ARQ wherein the packet size changes or slides based on the transmission quality of the transmission. The packet size is increased for a good transmission signal and decreased for a bad transmission signal. This is combined with a forward error correction signal.

Another object of the present invention is to provide a novel and improved cellular telephone data communication system for transmitting data from a computer over a cellular telephone unit. This system includes a microprocessor which is connected between the computer and a special cellular telephone modem to control the operation of the modem. The microprocessor prevents modem disconnect upon the loss of a carrier signal for periods less than a predetermined disconnect period.

A further object of the present invention is to provide a novel and improved cellular telephone data communication system for providing communication over a cellular telephone network between a portable computer and a computer connected to conventional telephone lines by use of unique modems. The portable computer is connected to a modem maintained in a unique state for cellular transmission by means of a microprocessor which controls the operation of the modem. The microprocessor adds error control correction data to a data signal from the computer before the data signal is provided to the modem. The data signal with the modulated error control correction data is provided by the modem to a cellular telephone transceiver which transmits the data to a receiving system capable of retransmitting the data over conventional telephone lines. At the central computer, a unique modem and microprocessor combination receives the data and removes the error correction control signals therefrom before providing the data signal to a use device.

Yet another object of the present invention is to provide a novel and improved cellular telephone data communication system for transmitting data from a computer over a cellular telephone unit. A microprocessor connected between the computer and a unique cellular modem senses a static condition of the modem and provides a repetitive synchronization byte to the cellular modem during a break in the data stream thereto.

A further object of the present invention is to provide a novel and improved cellular telephone data communication system for transmitting data from a computer over a cellular telephone network which incorporates a mobile data programming interface adapted to operate with a static data programming interface. Both such interfaces operate to either transmit or receive data and cooperate with an associated external computer used to provide a stream of data to be transmitted. Each interface includes a microporcessor which is programmed to adapt the transmitted data to the high error frequency prevalent in the cellular telephone environment and to control a modem operating in a unique mode for cellular transmission.

A still further object of the present invention is to provide a novel and improved cellular telephone data communication system for transmitting data from a computer over a cellular telephone network which incorporates a mobile data programming interface adapted to operate with a static data programming interface to overcome the effects of signal error causing factors in the cellular telephone system environment. The transmitting interface adds an error detection and correction format to the data signal and the receiving interface removes this format from a received data signal which is sent to a use device. The receiving interface responds to the error detection and correction portion of the received signal to check the data for error and to either acknowledge receipt of acceptable data or to provide error indication to the transmitting interface by withholding the acknowledgment. The transmitting interface evaluates the errors in the received data stream and varies a data packet repeat size for subsequently transmitted data. Also the transmitting interface retransmits previously transmitted data which was found to be erroneous at the receiving interface.

BEST MODE FOR CARRYING OUT THE INVENTION

Figure 1:
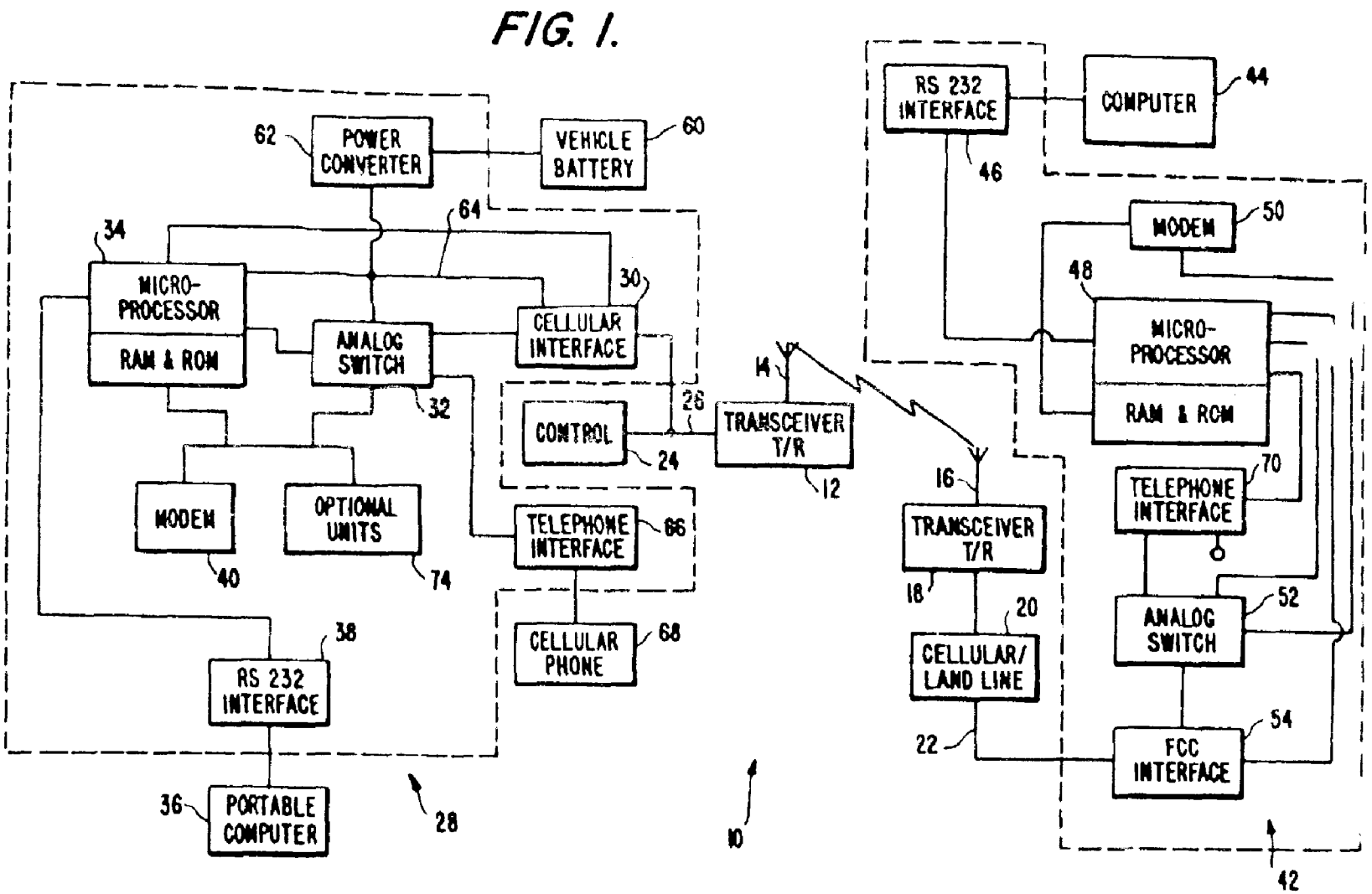
FIG. 1 is a block diagram of the cellular telephone data communication system of the present invention.

The system for transmitting data over a cellular telephone network of the present invention is indicated generally at 10 in FIG. 1. A vehicle mounted mobile cellular telephone system conventionally includes a transceiver 12 which transmits or receives voice signals in the radio frequency range by means of an antenna 14. Voice signals transmitted by the antenna 14 are received by an antenna 16 connected to a transceiver 18 located in a specific cell area of the cellular telephone network. The transceiver 18 is connected to cellular land line equipment 20 which is operative to transmit the received signal over conventional telephone lines 22. Voice signals from the telephone lines 22 may also be transmitted by the transceiver 18 and the antenna 16 back to the antenna 14 to be provided by the transceiver 12 to a conventional mobile cellular telephone unit. The transceiver 12 is controlled by a cellular telephone system control unit 24 which is connected to the transceiver by means of a cellular telephone bus 26. The cellular bus 26, for purposes of description, may be one which meets the AMPS (Advanced Mobile Phone Service) specifications determined by the Federal Communications Commission during test of the cellular system in Chicago. These specifications indicate that control signals between the transceiver 12 and the control unit 24 should be on an eight bit parallel party line bus and that the analog signals should be a different signal with a nominal −20 dbV level using a 24 wire interconnecting cable. A very complete description of the AMPS system is provided in "The Bell System Technical Journal", 1979, Vol. 58, No. 1, pp. 1–269.

To this point, the cellular telephone system with which the present invention is combined is a conventional cellular telephone system, and the mobile portion of this system is connected to the mobile data programming interface 28 of the present invention. This mobile data programming interface includes a cellular interface 30 which renders the remainder of the mobile data programming interface compatible with the cellular bus 26 of a particular cellular telephone system. For example, with AMPS compatible cellular telephones, the cellular interface 30 would consist of an eight bit parallel I/O, port party line drivers and receivers, operational amplifiers providing differential driving and receiving analog conversion between the −20 dbV signal on the cellular bus and the defined levels required by an analog switch and conditioning system 32 for the mobile data programming interface. Cellular interfaces of this type are known, commercially available items, as exemplified by cellular interfaces sold by Motorola Corporation of Schaumberg, Ill. or Oki of Japan.

The analog switch and conditioning system 32 is implemented using currently known switching technology. The system may incorporate CMOS analog switches operative in response to microprocessor generated control signals to switch the state of signal processing operational amplifiers. Basically, this analog switch and conditioning system operates to selectively connect various components of the mobile data processing interface to the cellular interface 30 in a manner to be described in greater detail.

The heart of the mobile data programming interface is a microprocessor 34 which provides control functions for the cellular interface 30 and analog switch and conditioning system 32 as well as for other portions of the mobile data programming interface to be described. This microprocessor may be a conventional 8/16 bit microprocessor, such as the Intel 8088 manufactured by Intel Corporation. The microprocessor includes random access (RAM) and read only (ROM) memory storage systems which contain the control and data error programs necessary to adapt computer data for cellular telephone transmission. The use of a separate microprocessor in the mobile data processing interface frees the limited memory which is normally available in portable computers for other uses.

A serial data stream is provided to the microprocessor 34 from an external portable computer 36 by means of a conventional RS 232 interface 38 included within the mobile data programming interface. Data received by the microprocessor from the portable computer 36 is provided with unique error correction signal information in the microprocessor before being provided to a modem 40.

The modem 40 may be one of a number of conventional modems used for telephone wire line transmission which has test mode capabilities for deactivating certain modem functions. A particular commercially available modem suitable for use as the modem 40 is the AMI 3530 modem manufactured by Gould Advanced Semiconductors of 3800 Hemstead Road, Santa Clara, Calif. Modems of this type, when employed for data transmission over conventional telephone lines, will disconnect immediately in response to a carrier loss. When such modems sense a channel blanked status occasioned by a carrier loss, they provide a "break bit" output and disconnect. Also, for normal use such modems include a scrambler system which assures that the data modulated signal is continuously changing, and this signal change is used by the modem PLL circuitry to provide synchronization. A non-scrambled modulated signal may be interpreted by the telephone operating equipment as a valid switch command, and this is particularly true when the modem is in the static condition. Normally the scrambler system in the modem prevents this static condition where loss of synchronization by the PLL or the interpretation of the static signal as a switch command is most likely to occur. However, modems such as the AMI 3530 incorporate a test mode of operation wherein the modem is prevented from disconnecting in response to carrier loss and wherein the modem scrambler can be deactivated or defeated. Normally, such modems would be incapable of effective operation in this test mode, but it is the availability of this test mode that renders modems of this type suitable for use as the modem 40.

The data stream from the microprocessor 34, which has been provided with unique error correction data by the microprocessor, is transmitted by the modem 40 through the analog switch 32 and cellular interface 30 to the transceiver 12. This data is then transmitted as a radio frequency signal by the antenna 14 to the antenna 16, where it is converted by the transceiver 18 and cellular land line equipment 20 to a signal suitable for transmission over conventional telephone lines 22. These telephone lines connect the signal to the second portion of the cellular transmission system of the present invention which is a static data programming interface 42 operative to pass data signals to and from the telephone line 22. The data signals which are passed to the telephone line originate at a host computer 44 which cooperates with the static data programming interface in a manner similar to the operation of the portable computer 36 with the mobile data programming interface 28.

For transmission purposes, the computer 44 provides data to an RS 232 interface 46 which in turn provides the data to a microprocessor 48. This microprocessor is identical in construction and function to the microprocessor 34, and is programmed with the same control and error correction and other programming. The microprocessor 48 adds error correction and control signals to the data provided from the RS 232 interface, and then provides the modified data stream to a modem 50. The modem 50 is identical in construction and function to the modem 40 and operates to transmit the data stream by means of an analog switch and conditioning system 52 to a conventional FCC interface 54. The FCC interface provides the data stream to the telephone lines 22 where they are sent by means of the cellular land line equipment 20 to the transceiver 18. The data is then transmitted to the transceiver 12 which provides it by means of the cellular interface 30 and the analog switch 32 to the microprocessor 34. The microprocessor then removes the error correction and control signals from the data stream and provides the data through the RS 232-interface 38 for display and use by the portable computer 36.

The static data programming interface 42 receives data transmitted over the cellular telephone line, and this incoming data from the FCC interface 54 is fed by means of the analog switch 52 to the microprocessor 48. Here the error and control signals are removed from the data and the data is then displayed and/or used by the computer 44. It will be noted that the static data programming interface 42 and the mobile data programming interface 28 are substantially identical in structure and operation with the exception that the static data programming interface is connected to telephone lines by an FCC interface while the mobile data programming interface is connected to a cellular telephone system by a cellular interface. Also, the mobile data programming interface may be powered from a vehicle battery 60 which operates through a conventional power converter 62 to provide power to a power bus 64. This power bus 64 is connected to provide power to all of the operating units in the mobile data programming interface 28 and may also be connected to provide power to the portable computer 36. The static data programming interface 42 includes a similar power bus, not shown, which is connected to any conventional power supply such as the power supply in a building containing the computer 44.

Although the mobile data programming interface 28 and the static data programming interface 42 must communicate with one another to effectively transmit data over a cellular telephone system, both of these units can also transmit and receive conventional cellular telephone audio transmissions. The mobile data programming interface 28 includes a telephone interface 66 which may be connected to an external telephone-like handset 68 and which operates in conventional manner through the analog switch and conditioning system 32 and cellular interface 30 to transmit and receive audio communications by means of the transceiver 12. In a similar manner, the static data programming interface 42 includes a telephone interface 70 which may be connected to an external telephone to transmit and receive audio signals through the telephone interface, the analog switch 52 and the FCC interface 54. Thus, both the mobile data programming interface 28 and the static data programming interface 42 are adapted for normal audio communication. Like the mobile data programming interface, the static data programming interface includes a control and display section 72 which is connected to the microprocessor 48 and which operates to receive data from which the microprocessor has extracted the control and error signals.

Both the mobile data programming interface 28 and the static data programming interface 42 will operate with optional equipment, and an optional equipment block 74 is shown for the mobile data programming interface in FIG. 1. This optional equipment might include other modems, a microphone which may be employed to provide audio communication in place of the cellular phone 68 and various memory and encrypting devices known to the art to accomplish automatic dialing and similar functions.

Figure 2:
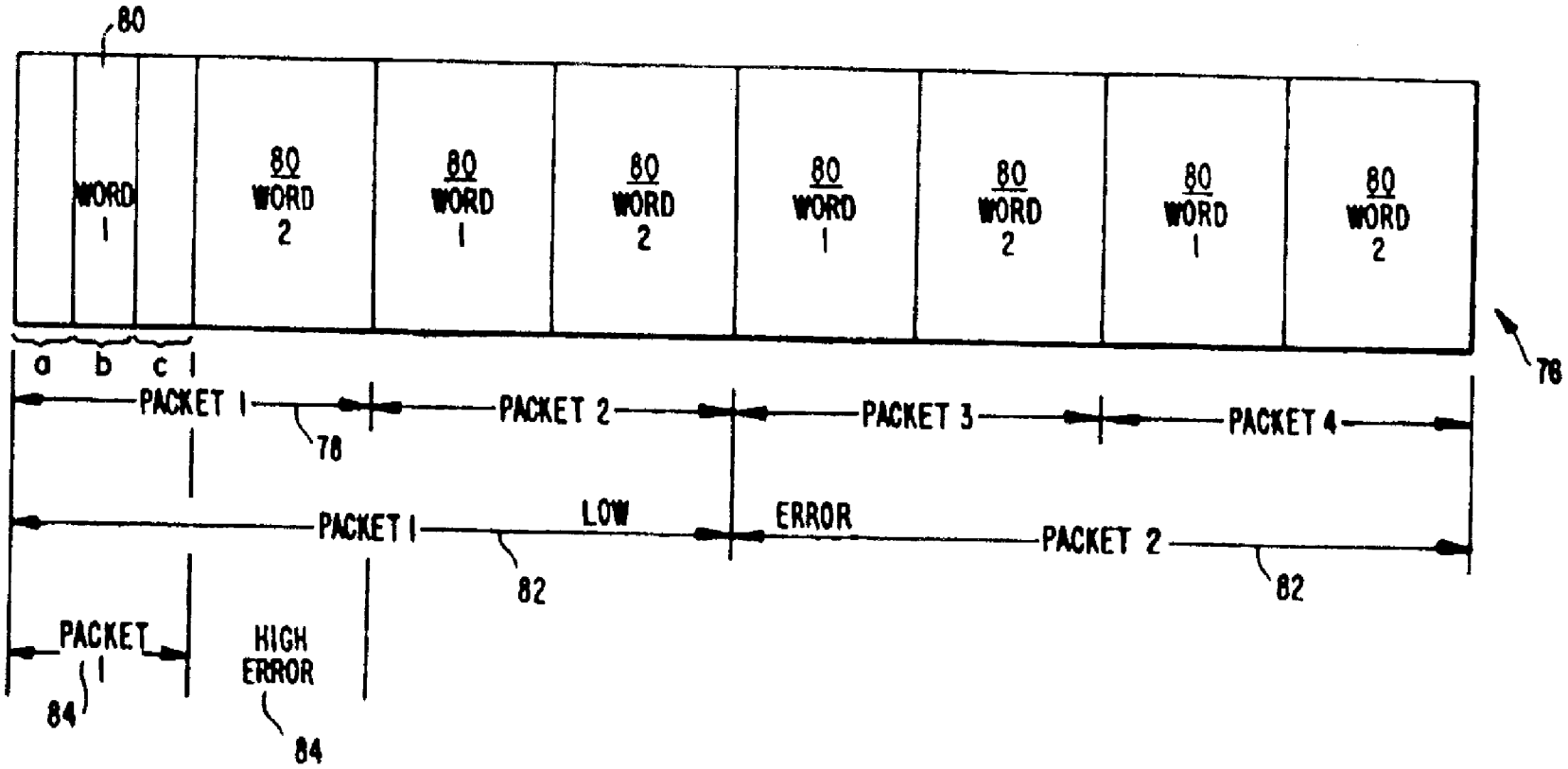
FIG. 2 is a diagram illustrating a manner in which the data signal to be transmitted by the cellular telephone data communication system of the present invention is modified to provide an error detection and correction capability.

Before considering in detail the operation of the mobile data programming interface 28 and the static data programming interface 42, it is necessary to understand the manner in which the microprocessor 34 and modem 40 and the microprocessor 48 and modem 50 cooperate to adapt a data signal for cellular telephone transmission. With reference to FIG. 2, there is diagramatically illustrated a data document 76 to be transmitted which has originated with the portable computer 36. This data document is divided, by the microprocessor 34, into a plurality of packets 78, and for purposes of illustration in FIG. 2, four packets of equal size are shown. In actuality, a document would be divided into many more packets which would not necessarily be of equal size. Further, each packet is divided by the microprocessor 34 into a plurality of words, and for purposes of illustration in FIG. 2, each packet 78 includes two words 80. Again, a packet would normally contain many more than two words, but two are shown for purposes of illustration. Each word in a packet includes three bytes a, b, and c, and the microprocessor 34 will determine whether the word is a control word or a data word. When the word is a data word, then bytes a and b will be data bytes, while byte c is a foward error correction (FEC) byte. Conversely, if the word is a control word, byte a will be the control word signifier, byte b will be the control word descriptor and again, byte c will be the FEC byte. Thus it will be noted that byte c is always the FEC byte for both data and control words.

Data words are always synchronous with the packet stream, while control words may or may not be asynchronous to data. An example of an asynchronous control word would be an acknowledgement word, while an example of a synchronous control word would be the packet "end" word which is the last word in every packet. Synchronous control words are added into the cyclic redundancy check (CRC) which is included in the packet "end" word, while asynchronous control words do not affect the CRC of a packet. An exemplary form for an asynchronous control word, for example, the acknowledgement word, would be a control word signifier for byte a, the packet number for byte b, and byte c, the FEC byte. On the other hand, an example of a synchronous control word, such as the packet "end word", would be a control word signifier for byte a, a CRC byte for byte b and the FEC byte as byte c. A control word synchronous to the packet indicates that byte b is a data rather than a control byte.

The FEC byte causes the receiving microprocessor to check the data bytes in a data word and determine whether or not an error exists in that word. If an error is detected, the microprocessor 48 will use the FEC byte to correct the word at reception. However, if a predetermined error level in any word within a packet is exceeded, an acknowledgment signal for the packet will not be transmitted back to the transmitting microprocessor, thereby causing this microprocessor to retransmit the entire packet. For example, the predetermined error level could be a specified number of bits per word, for example 2 bits. Correction would occur for any error of 2 bits or less, but an error in excess of 2 bits would result in no acknowledgment being transmitted for the packet.

The microprocessor unit 48 operates in a manner identical to that of the microprocessor 34 to form data packets with control and data words to transmit data provided from the computer 44, and the microprocessor 34 operates in the receiving mode to check the data byte and pass acceptable data onto the computer 36. If the transmitting microprocessor 48 or 34 does not receive acknowledgement signals back from the receiving microprocessor/correction, or other procedures to be described, are initiated by the transmitting microprocessor.

Referring back to FIG. 2, if the receiving microprocessor, in this example the microprocessor 48, examines a received data word and discovers an error in excess of the predetermined error level, it will not transmit a packet acknowledgement signal to the microprocessor 34. The transmitting microprocessor 34 will, by the lack of acknowledgment signals, be informed of excess error in a data packet 78, and will operate to retransmit this packet until the data is received in a substantially error-free or at least a correctable condition. To this point, the transmission of the data package has occured in much the same manner as does the transmission of a data stream over a telephone wire. However, in the telephone wire environment, the error frequency is not as great as that experienced with cellular telephone transmission systems, and consequently, a uniform packet repeat process for error correction is acceptable for wire line data transmission. This is not the case for cellular telephone transmission, because the high error frequency might well cause multiple packet repeats to such an extent that no transmission would ever occur. Consequently, the transmitting microprocessor of the present invention is programmed with an error correction capability which involves a sliding packet size. This packet size is changed in accordance with transmission quality determined by the transmitting microprocessor on the basis of an evaluation of the error frequency in signals received from previously transmitted data. The receiving microprocessor transmits a data stream to the transmitting microprocessor from which this evaluation is made. The packet size is increased for a good transmission signal and decreased for a bad transmission signal, so that in a high error situation, the retransmitted packet is of minimum size. The transmitting microprocessor is continuously evaluating the number of errors in the data stream it receives from the receiving microprocessor, and is adjusting the packet size of subsequent transmissions in accordance with this evaluated error data. Thus, as illustrated by FIG. 2, the packet size 78 might be increased during the transmission period by the transmitting microprocessor to a much larger packet size 82 when transmission errors are minimal, or, conversely, the transmitting microprocessor might decrease the packet size to a much smaller packet size 84 as transmission errors increase.

In the transmission mode, both the microprocessors 34 and 48 provide a sliding packet ARQ wherein the packet size changes or slides based on the transmission quality. In a high error situation, the packet size becomes smaller and the time required to repeat a packet containing error is lessened. Consequently, in a cellular transmission situation where errors are occurring frequently, a packet of reduced size containing corrected data may be received, while if the packet remained of greater size, numerous bytes of data would have to be retransmitted until all bytes of data in the packet are received correctly. This would reduce data transmission efficiency, or in extremely high error situations, prevent the reception of a correct packet.

The microprocessors 34 and 48 maintain the modems 40 and 50 on line in the event of a carrier signal loss during data transmission. As previously indicated, such a carrier transmission loss occurs when the vehicle bearing the mobile data programming interrace 28 passes between cells in a cellular telephone system. The modems 40 and 50 are operated normally in the test mode or a similar mode which prevents the modem from automatically disconnecting in response to a carrier signal loss. Instead, the modem is not permitted to disconnect until it receives a disconnect signal from the respective microprocessor 34 or 48. This microprocessor, which has been sending or receiving data, senses the carrier signal loss when it receives a "break bit" from the associated modem, and therefore, the microprocessor recognizes a carrier loss and initiates a time delay period before permitting the modem to disconnect. Generally, the hand-off period between cells of a cellular telephone system causes less than a one-second carrier signal loss, and consequently, the delay initiated by the microprocessor in response to a carrier loss may be anywhere within the range of from two to seven seconds. This delay period is sufficient to permit reestablishment of the carrier signal when the loss of carrier is occasioned by travel between cells. By never allowing a carrier loss to cause modem disconnect during this predetermined time delay period, the time needed for the modem to reestablish data transmission after the carrier loss terminates is decreased, thereby improving overall efficiency. Thus, if the carrier loss terminates during the predetermined time period set by the microprocessor, modem disconnect does not occur. On the other hand, the microprocessor will instruct the modem to disconnect when the data transmission is ended by the microprocessor, when the cellular telephone call is completed, as sensed by the cellular interface 30 or the FCC interface 54 and transmitted to the microprocessor, or when the delay period set by the microprocessor expires.

The modems 40 and 50 are not only used in the test mode to disable the normal modem disconnect circuitry, but also are used in a mode which disables the modem scrambler circuitry. It is important for effective cellular data transmission to prevent the scrambler polynomial from increasing the number of bit errors received, for these additional errors further reduce the effectiveness of the error correction scheme. However, with the scrambler defeated, the synchronization of the modem PLL circuitry is no longer provided and the non-scrambled modulated signal may be interpreted by the telephone company equipment as a valid switch command. Both of these problems are solved by the cooperation between the modem and its associated microprocessor. Considering the microprocessor 34 to be the transmitting microprocessor, all data sent by the modem 40 is first presented to the modem by the microprocessor. The microprocessor is programmed to ensure that the data signal provided to the modem has enough changing signals to keep the modem PLL in synchronization and to prevent the telephone switching equipment from assuming the signal is a valid switching command. It must be regconized, however, that data is not always sent by the modem 40 in a continuous stream, and that the modem is often in a static condition. It is when the modem is in this static condition that the modem PLL may lose synchronization or that the telephone equipment may interpret the static condition as a switch command. Normally, the modem scrambler would prevent the static condition, but in the present circuit, the transmitting microprocessor knows when the last data byte was presented to the modem and what the transmission rate of the modem is. With this information, the microprocessor determines when the modem is in a static condition, and immediately initiates the presentation of a unique byte of data to the modem. This unique byte is repeatedly presented until data is again available for transmission, or, in the alternative, until the modem is shut down. The characteristics of this unique byte, hereinafter known as the synch byte, are such that the bit stream is always changing, and the receiving modem recognizes this byte as a synch byte and not a valid data byte. These two conditions can be met by many different bytes, and the choice of which one to use is arbitrary.

Since the structure and operation of the mobile data programming interface 28 and the static data programming interface 42 are substantially the same, it will be recognized that both operate in the same manner to either transmit or receive data. Therefore, for purposes of description, the mobile data programming interface 28 will herein be described in connection with the transmission of data and the static data programming interface 42 will be described in connection with the reception of such data, but it must be noted that the roles can be reversed.

Figure 3:
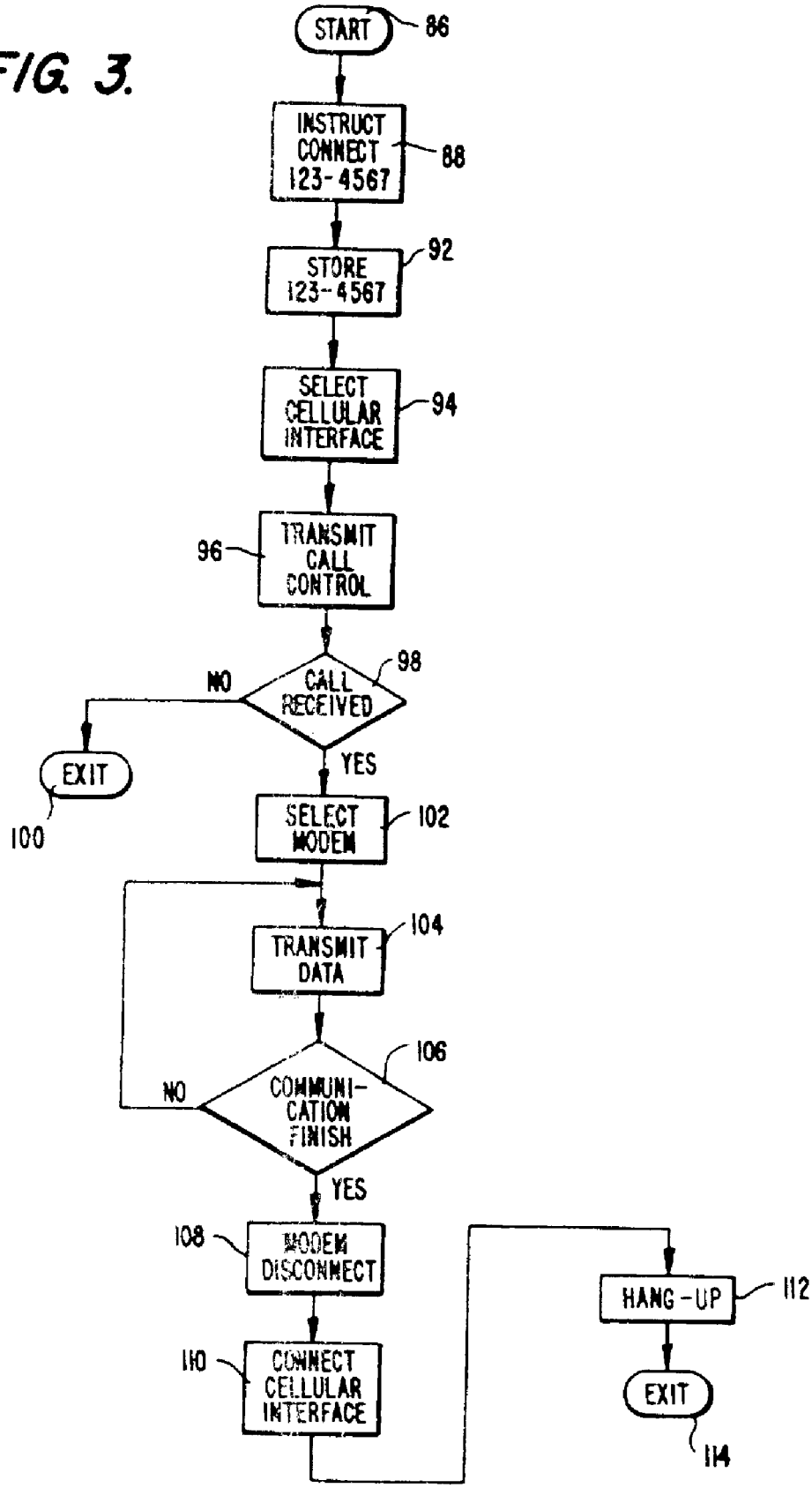
FIG. 3 is a flow chart showing the control functions of the microprocessor for a transmitting interface of the cellular telephone data communication system of the present invention.

Referring now to FIG. 3, there is illustrated a flow chart including the basic process steps used by the microprocessor 34 in transmitting a data signal over the cellular telephone system. The coding of the process steps of this flow chart into the instructions suitable to control the microprocessor 34 will be understandable to one having ordinary skill in the art of programming, and is illustrated in detail in the appendixed microfiche program. The flow chart of FIG. 3 is begun at start block 86, and the microprocessor 34 is adapted to receive dialing instructions as indicated by block 88 which originate at the portable computer 36 or from some other source. These instructions command the microprocessor to connect the system to a designated telephone number (123-4567) and the received instructions are stored in the microprocessor as shown by block 90. In response to the instructions, the microprocessor then operates to cause the analog switch and conditioning system 32 to complete an instruction path to the cellular interface 30 as taught at 94. With this path completed, the microprocessor operates at 96 to transmit the stored call control signals to the cellular interface with the instructions to cause the cellular interface to send the eight bit parallel control signals required to dial the phone number 123-4567. *As a first step in this transmission, the microprocessor checks the state of the cellular bus data lines. If the data lines are in use, the microprocessor enters a loop or waiting mode and does not actuate the AMPS interface and transmit the call control signals to the cellular bus until the data lines are not in use. When the data lines are not in use, the microprocessor will actuate the AMPS interface and transmit the call control signals to the cellular transceiver via the cellular bus. The method by which this first transmission step is implemented will be apparent to those skilled in the art on review of the commented source code implementing this step (located in the "dial.num" routine which is part of the BRIDGSUB routine) in the microfiche Software Appendix.* The microprocessor then waits for the call to be answered, and if this does not occur, the NO branch is taken from the decision block 98 to block 100 to exit from the flow chart in FIG. 3. However, if the call is answered, the YES branch is taken from the decision block 98 to block 102, where the microprocessor 34 instructs the analog switch and conditioning switch 32 to switch the signal path from the cellular interface to the modem 40. Subsequently, at block 104, the modem is instructed to transmit data received by the microprocessor.

Figure 4:
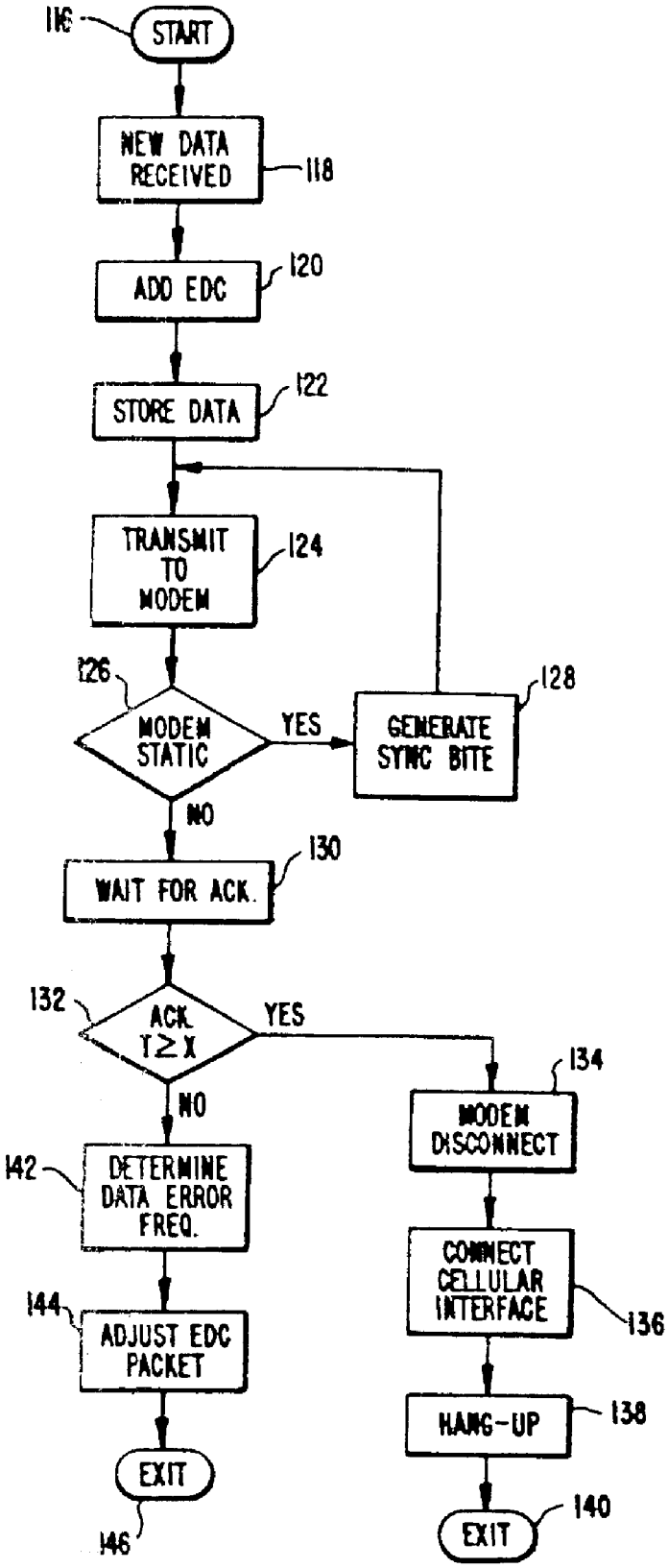
FIG. 4 is a flow chart showing the data processing function of the microprocessor for a transmitting interface of the cellular telephone data communication system of the present invention.

The specific control functions of the microprocessor 34 during the transmission of a data stream are illustrated in greater in FIG. 4, and for purposes of this description, the data transmission is monitored as indicated by the decision block 106. As along as data is being transmitted through the microprocessor 34, the NO branch of the decision block 106 takes the decision to the block 104 to continue the transmission of data. However, once data transmission is finished, the YES branch of the decision block 106 is taken to the modem disconnect block 108 where the microprocessor instructs the modem to terminate its function. Then the analog switch and conditioning system 32 is instructed, as indicated by the block 110, to disconnect the path between the modem and the cellular interface and to reconnect the microprocessor which, at 112, instructs the cellular interface to hang up the telephone and terminate the call before existing at 114.

Referring now to FIG. 4, a flow diagram is provided to illustrate in detail the operation of the microprocessor 34 during the block shown at 104 in FIG. 3 when data transmission is occuring. Again, the coding of the process steps used by the microprocessor 34 into the instructions suitable to control the microprocessor will be understood by one having ordinary skill in the art and are fully illustrated by the appendixed program.

Entering the flow chart at a start block 116, a data stream provided by the portable computer 36 through the RS 232 interface 38 is received by the microprocessor 32 as indicated by the block 118. Next, the data signal is modulated with the error detection and correction and other control bytes described in connection with FIG. 2, as illustrated by the block 120 and the modulated data stream is stored at 122. The data is then transmitted to the modem at 124, and the modem provides the data to the cellular interface for transmission As previously indicated, the microprocessor provides the data to the modem in a modulated signal which has enough changing signals to keep the modem PLL in synchronization. However, during the operation of the modem, the microprocessor monitors the data and modem operation to make sure that the modem is not static. The microprocessor uses the transmission rate of the modem and the time when the last data byte was presented to determine when the modem is in a static condition, and as indicated by the decision block 126, when the modem is static, the YES line to the block 128 shows that a repetitive synch byte is generated which is transmitted to the modem.

When the modem is not in the static condition, the NO line from the decision block 126 to the block 130 indicates that the microprocessor waits for the receipt of acknowledgment signals from the receiving microprocessor 48 for each word and packet of data transmitted. In the event of a loss of carrier signals, the microprocessors 32 and 48 respond to a "break bit" from the modem and initiate a time clock before permitting modem disconnect: As indicated by the decision block 132, when the awaited carrier signals are totally missing for a time t which is equal to or greater than a predetermined time x, the YES line to a modem disconnect block 134 is followed. At this point, the same operation which has occured with the blocks 108, 110, 112 and 114 in FIG. 3 occurs, and the modem is disconnected from the cellular interface. The cellular interface is reconnected to the microprocessor at 136 which instructs the cellular interface to perform a hang-up operation before exiting at 140.

On the other hand, if the time when no carrier signals are received is less than the predetermined delay time period x, then the NO line from the decision block 132 to a data error frequency determination block 142 becomes relevant. Here, the frequency of data errors at the receiving data microprocessor 48 is determined and employed at block 144 to adjust the EDC packet to provide larger or smaller packets in the manner described in connection with FIG. 2. Then this portion of the program is exited at 146.

The operation of the microprocessors 32 and 48 during the reception of data, evaluation of data errors and transmission of acknowledgment signals has been fully described previously. Since this operation is similar to that which occurs with wire line and other data transmission systems, it will be readily understood by those having ordinary skill in the art, and the instructions for the microprocessors are disclosed in detail by the appendixed program.

INDUSTRIAL APPLICABILITY

The cellular telephone data communication system of the present invention provides a cooperating mobile data programming interface and static data programming interface which operate together to perform the functions necessary to control errors in an efficient way to permit data transmission in the limited voice band available when using cellular telephone technology. Since both interfaces incorporate a microprocessor with independent firmware storage capabilities, a flexible system is provided wherein various computer control devices can execute the functions provided by a cellular telephone system. At the same time, the unit permits the cellular telephone system to be employed for the conventional audio transmissions which the system was designed to handle.

I claim:

[1. A method for transmitting data from a transmitting station over a cellular telephone system to a receiving station by means of a modem connected to said cellular telephone system which is operative in an activated state to modulate a carrier signal for said cellular telephone system with a data signal, said method including the steps of placing said modem in the activated state, providing a data signal to said activated modem, maintaining said modem in the activated state for a predetermined time period after a loss of said carrier signal before permitting said modem to deactivate, and causing said modem to remain in said activated state after the loss of said carrier signal if said carrier signal resumes within said predetermined time period.]

[2. The method of claim 1 which includes adding an error control correction data format to said data signal before providing said data signal to said mode.]

[3. The method of claim 1 which includes repetitively providing a unique data byte to said modem during a break in said data signal.]

[4. The method of claim 2 wherein the addition of said error control correction format involves dividing data to be transmitted into a plurality of data packet, each data packet including a plurality of data words, the number of data words in a data packet determining the size of the data packet, providing said data signal to said modem for transmission to said receiving station, examining the data words in each received data packet at the receiving station for error and determining which data words are acceptable, transmitting an acknowledgment signal to the transmitting station for each acceptable data word, determining from the transmitted acknowledgment signals which data packets were received with unacceptable errors and retransmitting said unacceptable data packets, and determining the frequency of error in said received data packets from said acknowledgment signals and adjusting the size of subsequent data packets to be transmitted in accordance with said error frequency.]

[5. The method of claim 4 which includes decreasing the size of subsequent data packets to be transmitted as the frequency of error in received data packets increases and increasing the packet size of subsequent data packets to be transmitted as the frequency of error in received data packets decreases.]

[6. The method of claim 4 which includes sensing a complete loss of said carrier signal for a predetermined period at said transmitting station and initiating said predetermined time period in response to said loss to maintain said modem in the activated state.]

[7. The method of claim 6 which includes causing said modem to disconnect and terminate transmission to said receiving station of all data packets if the signal is not resumed within said predetermined time period.]

[8. The method of claim 7 which includes operating said modem without a scrambler polynomial and continuously changing said data signal provided to said modem for modem synchronization.]

[9. The method of claim 8 which includes repetitively providing a unique data byte to said modem during a break in said data signal to prevent the modem from entering a static condition.]

[10. A method for transmitting data between a transmitting station and a receiving station which includes dividing data to be transmitted into a plurality of data packets, each data packet including a plurality of data words, the number of data words in a data packet determining the size of the data packet, transmitting said data packets to the receiving station, examining the data words in each received data packet for error and determining which data words are acceptable, transmitting an acknowledgment signal to the transmitting station for each acceptable data word, determining from the transmitted acknowledgment signals which data packers were received with unacceptable errors and retransmitting said unacceptable data packets, and determining the frequency of error in said received data packets from said acknowledgment signals and adjusting the size of subsequent data packets to be transmitted in accordance with said error frequency.]

[11. The method of claim 10 which includes decreasing the size of subsequent data packets to be transmitted as the frequency of error in received data packets increases and increasing the packet size of subsequent data packets to be transmitted as the frequency of error in received data packets decrease.]

[12. A signal processing interface for communicating data from a data source over a cellular telephone system to a receiving means via a cellular telephone radio carrier signal comprising processing means connected to receive data from said data source, said processing means operating to form said data into a data signal format to be transmitted as a data signal, the data signal format including blocks of data, at least one acknowledgment signal to be retransmitted by said receiving means back to said processing means upon receipt of each of said data blocks, cellular telephone transmission means operative upon receipt of said data signal format to transmit said data signal to said receiving means, and modem means connected to said signal processing means and said cellular telephone transmission means and operative to receive said data signal containing said data signal format from said processing means and to provide said data signal for transmission to said cellular telephone transmission means, said modem means being operative to disconnect from said cellular telephone transmission means in response to a disconnect signal and inoperative to disconnect in response to a loss of said cellular telephone radio carrier signal, said processing means operating to provide a disconnect signal to said modem means when a delay period subsequent to a loss of said cellular telephone radio carrier signal has elapsed without the resumption of said cellular telephone radio carrier signal.]

[13. The signal processing interface of claim 12 wherein said modem means operates without a scrambler polynomial, said processing means operating to continuously change said data signal to provide synchronization for said modem means.]

[14. The signal processing interface of claim 13 wherein said processing means operates in response to a break in said data to repetitively provide a unique data byte to said modem means for the duration of said break in the data.]

[15. A cellular telephone data communication system for communicating data from a data source over a cellular telephone system having a mobile transceiver unit operative to transmit and receive cellular telephone signals and a plurality of fixed transceiver units connected to transmit signals over a conventional telephone line system comprising a mobile signal processing interface means connected to said mobile transceiver unit and operative to communicate data from a data source to said mobile transceiver unit for transmission via a cellular telephone radio carrier signal or to receive a transmitted data signal from said mobile transceiver unit, and a static signal processing interface means connected to said conventional telephone line system and operative to communicate data from a data source over said conventional telephone line system to one of said fixed transceiver units for transmission via a cellular telephone radio carrier signal to said mobile unit or to receive a transmitted data signal via said conventional telephone line system, each said mobile signal processing interface means and static signal processing interface means being operative in a transmitting or receiving mode while the other operates in the opposite mode and each including signal processing and control means connected to receive data from a respective data source in the transmitting mode, said signal processing and control means also being operative in the receiving mode to receive a data signal from the associated mobile transceiver unit or associated conventional telephone line system, and modem means connected to said signal processing and control means, the signal processing and control means of the mobile or static signal processing interface means operating in the transmitting mode being operative to receive data from the associated data source and to form said data into a data signal format to be transmitted as a data signal to the modem means connected thereto, said modem means being operative to disconnect in response to a disconnect control signal and inoperative to disconnect in response to a loss of said cellular telephone radio carrier signal, the signal processing and control means operating to provide a disconnect control signal to the modem means connected thereto when a delay period subsequent to a loss of said radio carrier signal has elapsed without the resumption of said telephone radio carrier signal.]

[16. The cellular telephone data communication system of claim 15 wherein the data signal format is formed by the signal processing and control means for the mobile or static signal processing interface means operating in the transmitting mode by dividing data to be transmitted into a plurality of data packets, each data packet including a plurality of data words, the number of data words in a data packet determining the size of the data packet, the signal processing and control means for the mobile or static signal processing interface means operating in the receiving mode being operative to receive and examine the data words in each transmitted data packet for error to determine which data words are acceptable and to transmit an acknowledgement signal for each acceptable data word to the transmitting mobile or static signal processing interface means, the signal processing and control means for the transmitting mobile or static signal processing interface means operating to receive and determine the frequency of error in said received data packets from said acknowlegment signals and to adjust the size of subsequent data packets to be transmitted in accordance with said error frequencey.]

[17. The cellular telephone data communication system of claim 16 wherein the signal processing and control means for the transmitting mobile or static signal processing interface means operates to control the size of subsequent data packets inversely to the error frequency detected thereby.]

[18. A data processing interface for operation in a transmitting mode for transmitting data from a data source over a cellular telephone system to a receiving means via a cellular telephone radio carrier signal comprising processing and control means connected to receive data from said data source, said processing and control means operating to form said data into a data signal format to be transmitted as a data signal, said data signal format including a plurality of data packets, each said data packet including a number of data and control words, the number of words in a data packet determining the size of the data packet, each said data packet including an error control correction data format having at least one acknowledgement section, the acknowledgement section adapted to be retransmitted by said receiving means as an acknowledgment signal when an acceptable data packet is received by said receiving means, and modem means connected to said processing and control means to receive said data signal therfrom, said modem means being operable to modulate said cellular telephone radio carrier signal with said data signal and to provide said modulated signal to said cellular telephone system, said modem means receiving the acknowledgment signals transmitted by the receiving means and operating to provide such acknowledgment signals to said processing and control means, the processing and control means determining from said acknowledgment signals the frequency of error in the received data packets and adjusting the size of subsequent data packets in the data signal in accordance with said error frequency.]

[19. The data processing interface of claim 18 wherein said processing and control means determines from the acknowledgment signals which data packets were received with unacceptable errors and provides said data packets to said modem means for retransmission by said cellular telephone system.]

[20. The data processing interface of claim 19 wherein said modem means operates without a scrambler polynomial, said processing and control means operating to continuously change the data signal to provide synchronization for said modem means.]

[21. The data processing interface of claim 19 wherein said modem means operates without a scrambler polynomial, said processing and control means operating in response to a break in the data from said data source to repetitively provide a unique data byte to said modem means for the duration of said break in the data.]

[22. The data processing interface of claim 19 wherein said modem means is operative to disconnect from said cellular telephone system in response to a disconnect signal and inoperative to disconnect in response to a loss of a cellular telephone radio carrier signal, said processing and control means operating to provide a disconnect signal to said modem means when a delay period subsequent to a loss of said cellular radio carrier signal has elapsed without the resumption of said cellular telephone radio carrier signal.]

[23. The data processing interface of claim 22 which is operative in a receiving mode to receive a data signal transmitted by said cellular telephone system, said modem means receiving the data signal from said cellular telephone system and providing said data signal to said processing and control means, the processing and control means operating to examine the data words in each received data packet for error to identify acceptable data words and providing an acknowledgment signal to said cellular telephone system for each acceptable data word, the processing and control means operating to remove the error control correction data format from said data section.]

[24. The data processing interface of claim 23 wherein said modem means operates without a scrambler polynomial, said processing and control means operating to continuously change said data signal to provide synchronization for said modem means.]

[25. The data processing interface of claim 24 wherein said processing and control means operates in response to a break in the data from said data source to repetitively provide a unique data byte to said modem means for the duration of the break in said data.]

*26. A vehicular wireless voice and data communication system, comprising*

*a. a cellular telephone transceiver mounted within a vehicle for accessing a cellular telephone network operating in accordance with a standardized cellular network operating protocol to send and receive voice and data signals over a cellular telephone network, the cellular telephone transceiver including circuitry specifically adapted to cause the cellular telephone transceiver to respond to cellular transceiver control signals formatted in accordance with a standardized cellular network operating protocol specific to the cellular telephone network;*

*b. a computing device, including a memory sufficient to allow the computing device to be used in the manner of a portable computer, operable to generate transceiver control signals to control communication over the cellular wireless network from within the vehicle, the control signals being formatted in accordance with a standardized computer data communication protocol that differs from the standardized cellular network operating protocol implemented by the cellular telephone transceiver, and*

*c. circuitry for connecting the cellular telephone transceiver and the computing device to allow transceiver control signals, generated by the computing device and formatted in accordance with the standardized computer data communication protocol, to be implemented by the cellular telephone transceiver using the standardized cellular network operating protocol.*

*27. A cellular telephone data transmission apparatus, comprising*

*a. a cellular telephone transceiver for accessing a cellular wireless network for sending and receiving voice and data signals over a cellular telephone network, the cellular telephone transceiver operating in different modes including a call placement mode and a data transceiving mode;*

*b. a computing device including a memory sufficient to allow the computer device to operate as a portable computer, the computing device operating to send and receive data over the cellular telephone network when the cellular transceiver is operating in the data transceiving mode, and*

*c. a circuit connected with the cellular telephone transceiver and the computing device for determining when the cellular telephone transceiver is operating in the data transceiving mode and causing the computing device to send and receive data over the cellular telephone network only when the transceiver is operating in the data transceiving mode.*

*28. A combined portable computing and cellular voice and data communication device, comprising*

*a. a cellular telephone transceiver for accessing a cellular telephone network for either voice or data communication, the cellular transceiver operating in accordance with a standardized cellular network operating protocol to send and receive voice and data signals over a cellular telephone network, the cellular telephone transceiver including circuitry specifically adapted to cause the cellular telephone transceiver to respond to cellular transceiver control signals formatted in accordance with the standardized cellular network operating protocol specific to the cellular telephone network;*

*b. a portable computer operating to generate transceiver control signals to control communication over the cellular telephone network, the control signals being formatted in accordance with a standardized computer data communication protocol that differs from the standardized cellular network operating protocol implemented by the cellular telephone transceiver, the portable computer including computer memory sufficient to allow for portable computer uses other than generating cellular telephone transceiver control signals; and*

*c. circuitry for connecting the cellular telephone transceiver and the portable computer to allow transceiver control signals, generated by the portable computer and formatted in accordance with the standardized computer data communication protocol, to be implemented by the cellular telephone transceiver using the standardized cellular network operating protocol,*

*whereby the portable computer, in one mode, may be used to originate control signals to control the operation of the transceiver to control the transceiver to allow user data processed by the portable computer to be sent over the cellular network and to allow user data to be received by the portable computer for subsequent processing by the portable computer and, in another mode, may be used for data processing functions other than control of the cellular telephone transceiver.*

*29. A system for transferring data between a mobile station and at least one fixed station over a cellular telephone network comprising:*

*a vehicular mobile radio telephone network access device capable of bidirectionally communicating voice and data between the mobile station and a fixed station;*

*a computer in said vehicle, the computer providing and receiving data signals;*

*an interface circuit connected between the computer and the vehicular mobile radio telephone network access device for transmitting data signals to and from the vehicular mobile radio telephone network access device, said interface circuit providing lines for connection to the vehicular mobile radio telephone network access device, said lines including:*

*a data transmit line for transmitting data signals received from the computer to the vehicular mobile radio telephone network access device;*

*a data receive line for transmitting data signals from the vehicular mobile radio telephone network access device to the computer; and*

*plural control lines for providing at least one digital control signal, including a dial control signal, to the vehicular mobile radio telephone network access device to control the operation of the device;*

*dialing circuit in said interface circuit connected to at least one of the control lines for allowing the computer to cause the vehicular mobile radio telephone network access device to set up a cellular call; and*

*a program residing in said computer, said program causing said dialing means to set up the cellular call over the radio telephone network.*

*30. The cellular telephone data communication system of claim 29, further including a modem operably connected to the computer for modulating data signals received from the*

*computer for transmission over the vehicular mobile radio telephone network access device and for demodulating data signals received from the vehicular mobile radio telephone network access device.*

*31. The cellular telephone data communication system of claim 29 wherein said interface circuit inserts error correction bits into said data signal.*

*32. The cellular telephone data communication system of claim 29 wherein said data signal is packetized.*

*33. The cellular telephone data communication system of claim 32 wherein said packetized data signal comprises packets of variable length, said packet length adjusted according to signal quality.*

*34. The cellular telephone data communication system of claim 29 wherein said computer, said interface device and said vehicular mobile radio telephone network access device is powered by a vehicle battery.*

*35. A cellular computer data transmission system disposed in a vehicle for communicating bidirectional computer data to and from a fixed location over a cellular telephone network, the system comprising a radio transceiver having a digital controller for generating control signals including network access signals for controlling the operation of the radio transceiver for communicating on the cellular network, a computer separate from the digital controller, the computer operating to control access to the cellular telephone network and for originating and receiving data and an interface for providing a data path between the computer and the radio transceiver, the interface containing a modem for modulating and demodulating data signals for transmission on the cellular telephone network, the interface including parallel signal lines between the computer and the radio transceiver including at least a transmit signal line, a receive signal line, and a control line, whereby data are communicated between the computer in the vehicle and a fixed station over the cellular network.*

*36. The cellular computer data transmission system of claim 35 wherein the data contain error correcting bits.*

*37. The cellular computer data transmission system of claim 35 wherein the data are packetized.*

*38. The cellular computer data transmission system of claim 37 wherein the packetized data comprise packets of variable length, the length adjusted according to error rate.*

*39. A vehicle mobile computer communications system comprising:*

*a radio transceiver means for communicating over a cellular telephone network;*

*a digital controller for generating control signals including network access signals for controlling the operation of the radio transceiver;*

*a computer means separate from the digital controller for running at least one application program providing and receiving data;*

*an interface means disposed between said computer means and said radio transceiver means, said interface means containing a modem and parallel signal lines including at least a transmit line, a receive line and plurality of control lines;*

*said interface means transferring data from said application program in said computer means to said radio transceiver means for transmission over said cellular telephone network and transferring received data from said radio transceiver means to said application in said computer means.*

*40. The vehicle mobile computer communications system of claim 39 wherein said computer means inserts error correction bits into said data.*

*41. The vehicle mobile computer communications system of claim 39 further comprising dial means contained in said interface means for causing said transceiver means to place a call over said cellular communications network.*

*42. The vehicle mobile computer communications system of claim 41 wherein said application program causes said dial means to automatically place a call over said cellular communications network.*

*43. A cellular telephone data communication system for communicating data over a cellular telephone system between a fixed station and a mobile station comprising:*

*at least one mobile radio transceiver having a digital controller for generating control signals including network access signals for controlling the operation of the radio transceiver, said mobile radio transceiver being coupled to a computer separate from said digital controller, said mobile radio transceiver capable of bidirectionally communicating voice and data between said mobile station and said fixed station, said computer being capable of executing at least one application program;*

*said application program causing said mobile radio transceiver to establish communication with said fixed station upon the occurrence of a predetermined event, said application program then sending data to said fixed station.*

*44. The cellular telephone data communication system of claim 43 further comprising an interface disposed between said radio transceiver and the computer, the interface allowing the computer to control said radio transceiver.*

*45. The cellular telephone data communication system of claim 44 wherein said interface inserts error correction bits into said data.*

*46. The cellular telephone data communication system of claim 43 wherein said data is packetized.*

* * * * *